US008818031B1

(12) United States Patent
Kelly et al.

(10) Patent No.: US 8,818,031 B1
(45) Date of Patent: Aug. 26, 2014

(54) UTILITY POLE GEOTAGGER (75) Inventors: James Fintan Kelly, Milpitas, CA (US); Michael Skinner, San Francisco, CA (US); Alexander Robert Perry, Santa Monica, CA (US); John Hendrickson, Chatsworth, CA (US); Matthew Wang, Mountain View, CA (US)

(73) Assignee: Google Inc., Mountain View, CA (US)

( * ) Notice: Subject to any disclaimer, the term of this patent is extended or adjusted under 35 U.S.C. 154(b) by 202 days.

(21) Appl. No.: 13/410,657

(22) Filed: Mar. 2, 2012

(51) Int. Cl.
*G06K 9/00* (2006.01)
(52) U.S. Cl.
USPC .......................................................... 382/103
(58) Field of Classification Search
USPC ............ 356/3.1, 623; 382/103; 701/489, 512
See application file for complete search history.

(56) References Cited

U.S. PATENT DOCUMENTS

| 8,583,313 | B2 * | 11/2013 | Mian | 701/28 |
| 8,688,377 | B1 * | 4/2014 | Urbach et al. | 701/522 |
| 2005/0276464 | A1 * | 12/2005 | Duquette et al. | 382/151 |
| 2006/0256007 | A1 * | 11/2006 | Rosenberg | 342/357.08 |
| 2006/0259574 | A1 * | 11/2006 | Rosenberg | 709/217 |
| 2009/0262974 | A1 * | 10/2009 | Lithopoulos | 382/100 |
| 2010/0076631 | A1 * | 3/2010 | Mian | 701/19 |
| 2011/0282622 | A1 * | 11/2011 | Canter | 702/150 |
| 2012/0075338 | A1 * | 3/2012 | Curtis et al. | 345/629 |
| 2012/0077522 | A1 * | 3/2012 | Mate et al. | 455/456.3 |
| 2012/0127161 | A1 * | 5/2012 | Wallbom et al. | 345/419 |

FOREIGN PATENT DOCUMENTS

JP 2009037419 A * 2/2009 .............. G06T 7/00

OTHER PUBLICATIONS

Cheng, Wengang et al., "Power Pole Detection Based on Graph Cut," 2008 Congress on Image and Signal Processing, IEEE Computer Society, pp. 720-724.
Cetin, B. et al., "Automated Electric Utility Pole Detection from Aerial Images," Southeastcon '09, IEEE, Mar. 5-8, 2009, 6 pages.
Lehtomaki, Matti et al., "Detection of Vertical Pole-Like Objects in a Road Environment Using Vehicle-Based Laser Scanning Data," Remote Sensing 2010, vol. 2, pp. 641-664.

* cited by examiner

*Primary Examiner* — Gregory F Cunningham
(74) *Attorney, Agent, or Firm* — Lerner, David, Littenberg, Krumholz & Mentlik, LLP (57) ABSTRACT According to one aspect, embodiments of the invention provide a method for determining the geographic location of an object, the method comprising retrieving at a vision system a plurality of images from a database, each image related to a respective vantage point, detecting, with the vision system, the object in at least two of the plurality of images, generating a vector in relation to the respective vantage point for each image in which the object was detected, and triangulating, based on the intersection of at least two vectors, the geographic location of the object.

20 Claims, 11 Drawing Sheets

UTILITY POLE GEOTAGGER

BACKGROUND OF THE DISCLOSURE

1. Field of the Invention

Aspects of the present invention relate to a system and method for determining the geographic location of a specific object.

2. Discussion of Related Art

Utility companies and municipal organizations often require the geographic location of to specific objects when designing their utility networks and/or construction plans. For example, a utility company installing a fiber optic network may need to know the location of pre-existing utility poles within a certain area, a street planner may want to know the location of stop signs within a certain area, and a water company may want to know the location of fire hydrants within a certain area. One current method for identifying the location of specific objects (e.g., utility poles, stop signs, fire hydrants etc.) within an area is to have an individual manually inspect an area for the specific object and record the geographic locations of any identified objects. Another current method for identifying the geographic location of specific objects is to review aerial or satellite images of the area for the specific objects.

SUMMARY

Aspects in accord with the present invention are directed to a method for determining the geographic location of an object, the method comprising retrieving at a vision system a plurality of images from a database, each image related to a respective vantage point, detecting, with the vision system, the object in at least two of the plurality of images, generating a vector in relation to the respective vantage point for each image in which the object was detected, and triangulating, based on the intersection of at least two vectors, the geographic location of the object.

According to one embodiment, the method further comprises combining, in a single representation, vectors from each image in which the object was detected. In one embodiment, the method further comprises outputting to an interface a representation of the geographic location of the object.

According to another embodiment, the method further comprises filtering the geographic location of the object. In one embodiment, filtering the geographic location of the object comprises clustering intersections of vectors into groups based on proximity, identifying a first group of vectors containing the highest number of intersections, disregarding vectors included within the first group, identifying, in response to disregarding, a second group of vectors which no longer contains intersections, and eliminating, in response to identifying, vectors included within the second group. In another embodiment, filtering the geographic location of the object comprises confirming the presence of the object in reference to aerial or satellite imagery. In one embodiment, filtering the geographic location of the object comprises confirming the presence of the object in reference to point cloud data of the geographic location.

According to one embodiment, generating a vector comprises calculating a horizontal to position for each image in which the object was detected, associating each horizontal position with a rotational angle in relation to the respective vantage point of the related image. In another embodiment, detecting comprises breaking down each image into a plurality of pixels, and individually analyzing each pixel for a structure representative of the object.

According to another embodiment, individually analyzing comprises applying a single line detector to each one of the plurality of pixels at a plurality of different orientations, and recording each pixel's response to the line detector at each one of the plurality of different orientations. In one embodiment, the method further comprises encoding each pixel with a color indicative of whether the pixels response to the line detector signifies the presence of the structure representative of the object.

According to one embodiment, calculating the horizontal position comprises filtering the encoded pixels to identify a grouping of pixels indicative of the presence of the structure representative of the object, and calculating an average horizontal position of the grouping of pixels.

Another aspect in accord with the present invention is directed to a system for determining the geographic location of an object, the system comprising an interface configured to receive a defined geographic area from a user, a database configured to store a plurality of images in relation to the defined geographic area, a vision system configured to receive the plurality of images from the database and identify the presence of the object within any of the plurality of images, and a processor configured to generate a vector for each image in which the object was detected and triangulate, based on the intersection of at least two vectors, the geographic location of the object.

According to one embodiment, the system further comprises an output display configured to provide the geographic location of the object to the user. In another embodiment, the vision system comprises a single line detector, and an encoder, wherein the vision system is configured to break down each one of the plurality of images into a plurality of pixels and apply the single line detector to each one of the plurality of pixels at a plurality of different orientations, and wherein the encoder is configured to encode each pixel with a color indicative of whether the pixels response to the line detector signifies the presence of a structure representative of the object.

According to another embodiment, in generating the vector for each image, the processor is further configured to calculate a horizontal position for each image in which the object was detected, associate each horizontal position with a rotational angle in reference to to the related image.

Aspects in accord with the present invention are also directed to a computer readable medium comprising computer-executable instructions that when executed on a processor performs a method for determining the geographic location of an object, the method comprising acts of retrieving at a vision system a plurality of images from a database, each image related to a respective vantage point, detecting, with the vision system, the object in at least two of the plurality of images, generating a vector in relation to the respective vantage point for each image in which the object was detected, and triangulating, based on the intersection of at least two vectors, the geographic location of the object.

According to one embodiment, generating a vector comprises calculating a horizontal position for each image in which the object was detected, associating each horizontal position with a rotational angle in relation to the respective vantage point of the related image. In another embodiment, detecting comprises breaking down each image into a plurality of pixels, applying a single line detector to each one of the plurality of pixels at a plurality of different orientations, and recording each pixel's response to the line detector at each one of the plurality of different orientations. In one embodiment, the method further comprises encoding each pixel with a representation indicative of whether the pixels response to the line detector signifies the presence of a structure representative of the object.

BRIEF DESCRIPTION OF DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing. In the drawings.

DETAILED DESCRIPTION

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As described above, utility and construction companies often desire to learn the geographic location of specific objects (e.g., utility poles, stop signs, fire hydrants etc.) within a given area. However, the current methods of either visually inspecting the area in person or reviewing aerial or satellite imagery of the area can prove to be slow, inefficient and inaccurate. For example, an individual visually inspecting a given area for specific objects may be relying on incomplete or inaccurate documentation, inaccurately record the location of the object, unintentionally miss a portion of the given area and/or take a long time to do a thorough to inspection of the area. In another example, the review of aerial or satellite imagery may also prove ineffective as the specific objects may be difficult to identify from above. For instance, utility poles may appear as small dots in a satellite image and may be very difficult for a user to identify. In addition, poor resolution of aerial or satellite imagery may prevent an accurate review of the imagery.

As such, embodiments herein provide a more efficient and accurate system and method for determining the geographic location of an object by analyzing a plurality of street view images, identifying the presence of objects within any of the plurality of images, and based on the identified objects, determining the geographic location of a specific object.

Figure 1:
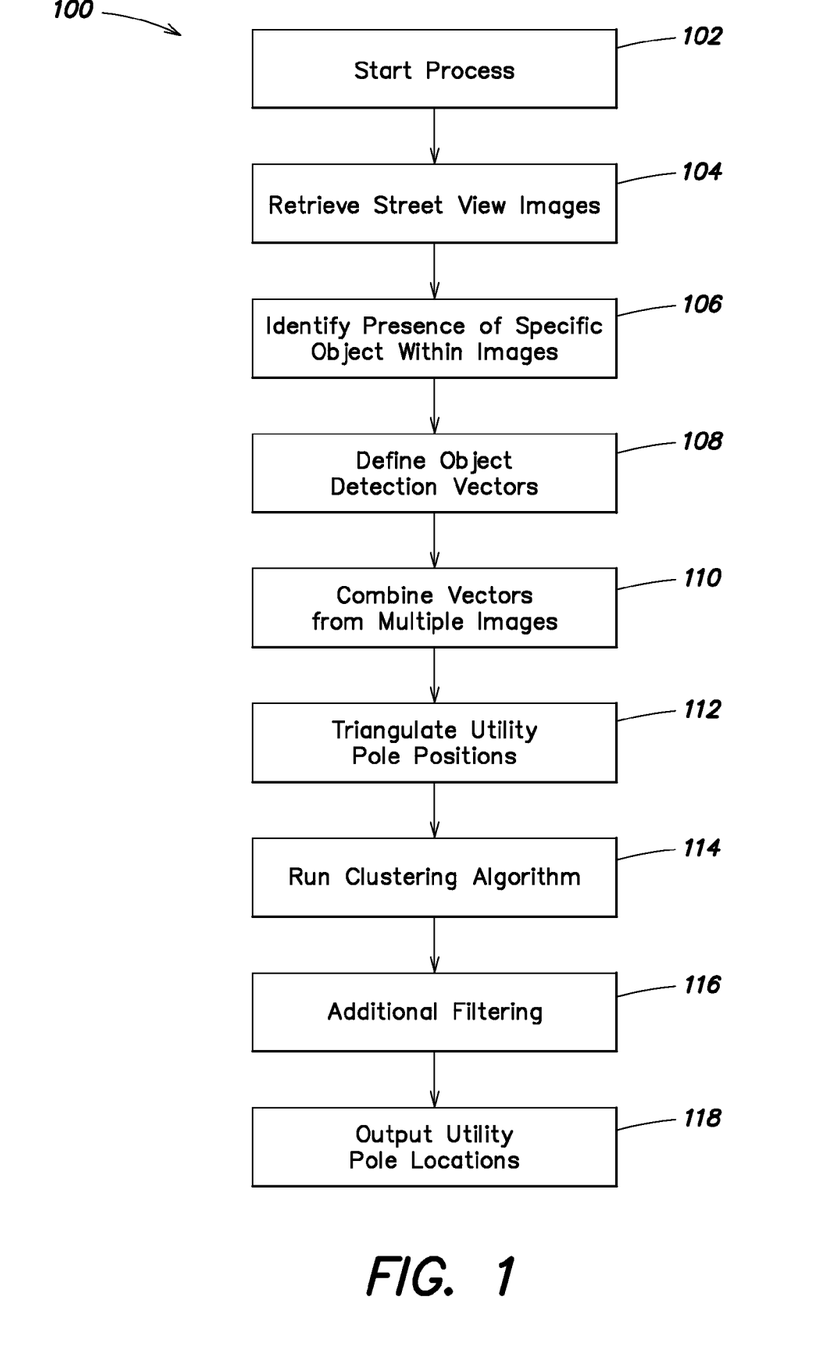
FIG. 1 is a flow chart of a process for determining the geographic location of a specific object in accordance with one embodiment of the present invention.

FIG. 1 is a flow chart 100 of a process for determining the geographic location of a specific object (e.g., a utility pole). At block 102, the process is initiated by a user wishing to identify the geographic location of utility poles within a defined area. According to one embodiment, a user selects the defined area by using an interface (e.g., a mouse, keyboard, touch screen etc.) to select a portion of a map displayed on the output display of a computer. For instance, in one example, the user operates a computer mouse to drag a box over a portion of the displayed map, thereby indicating the desired area within which the user wishes to identify the presence of utility poles. In other embodiments, a user selects the defined area by entering street names or GPS coordinates into an interface of a computer.

At block 104, a plurality of street view images, each one previously recorded on a street located within the area selected by the user, is retrieved from a database. According to one embodiment, the database is located locally to the user; however, in another embodiment, the database is located at a different location than the user and the user communicates with the database over an external network (e.g., via the internet).

Each one of the retrieved street view images is a street level image (e.g., ground level view) of the street (and adjacent area) on which the camera recording the image is located. According to one embodiment, the street view images are 360 degree panorama thumbnails of the street and areas immediately adjacent to the street on which the camera is recording the images.

For example, in one embodiment street view images may be recorded by a camera located on a vehicle. As the vehicle traverses a street within the defined area, the camera located on the vehicle automatically records images of the street and adjacent areas. The images are uploaded to the database for later image processing and analysis. According to one embodiment, in addition to the street view images, geographic position and orientation information of the vehicle and camera (e.g., obtained from a Global Positioning System (GPS) within the vehicle) is also associated with each street view image and uploaded to the database.

Figure 2:
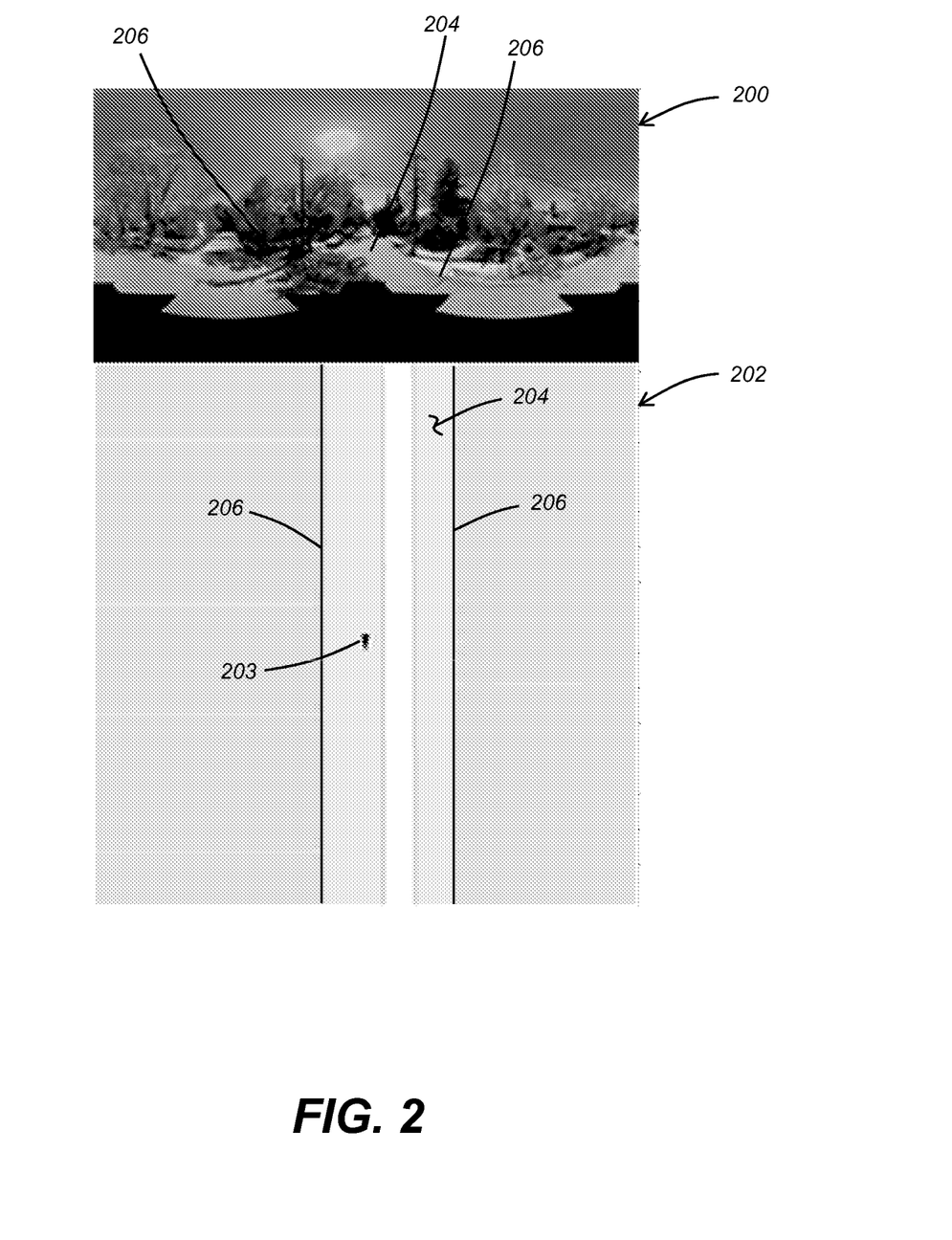
FIG. 2 is a split view image illustrating a street view image of a street and a graphical representation of the street in accordance with one embodiment of the present invention.

For example, FIG. 2 is a split view image illustrating a street view image 200 of the street 204 on which the vehicle 203 (and hence camera) is located and a graphical representation 202 of the street 204 on which the vehicle 203 (camera) is currently located. The camera records images 200 of the street 204 and areas 206 adjacent to (i.e. on each side of) the street 204 and creates a 360 degree panorama image 200 of the street 204 and the areas adjacent 206 the street 204.

At block 106 analysis of the retrieved plurality of street view images is begun. Each one of the plurality of street view images is analyzed separately by a vision system to determine if at least one of the specified objects (e.g., a utility pole) is identified in the image. A more detailed description of the vision system is described below in reference to FIGS. 7-9.

Upon identifying the presence of at least one utility pole in a street view image, the vision system calculates a horizontal position within the image space for each detected utility pole. Due to the 360 degree nature of the panorama street view image, the horizontal position corresponds to a rotation angle about the origin of the vehicle (i.e. camera).

At block 108, using the horizontal position (i.e. rotation angle) information of each utility pole identified in the street view images in addition to the position and orientation information of the vehicle associated with each street view image, an object detection vector is generated for each identified utility pole in relation to the camera.

Figure 3:
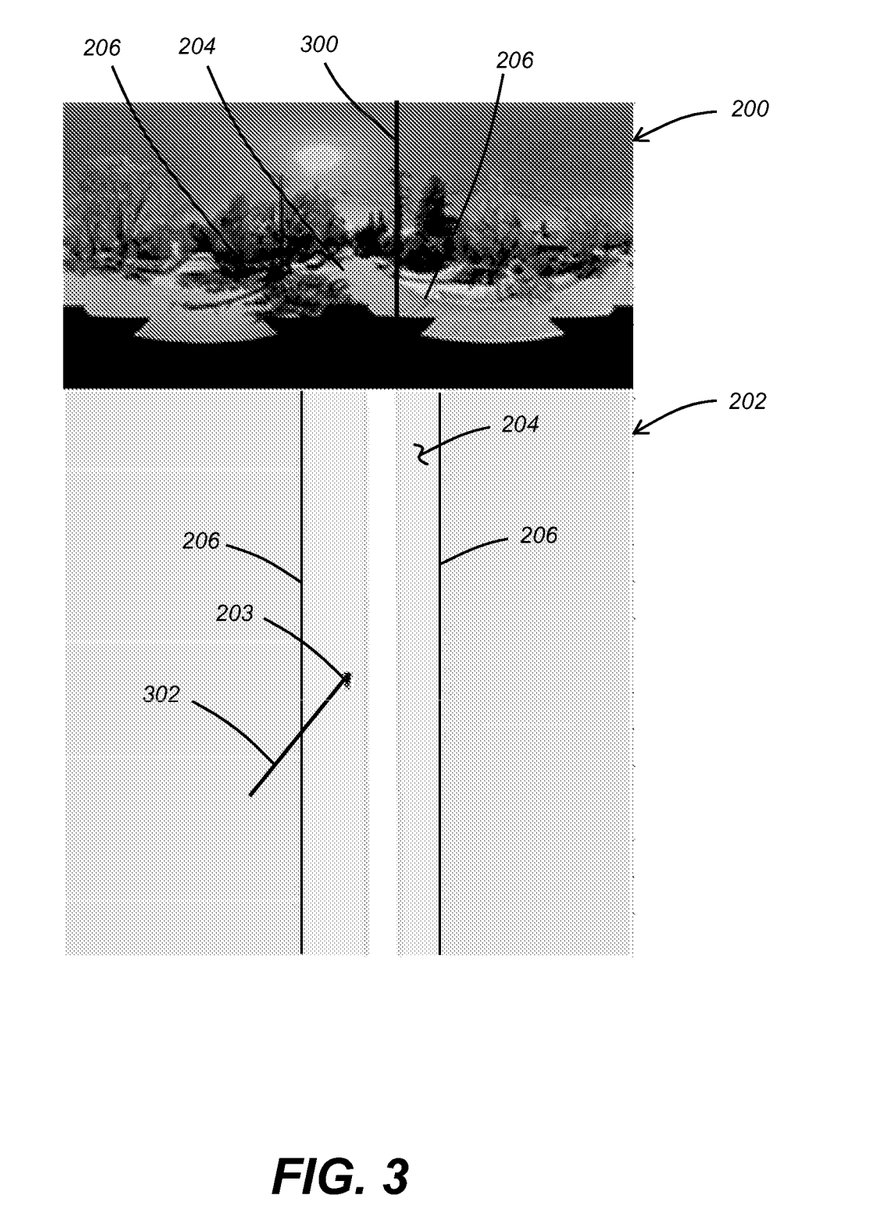
FIG. 3 is a split view image illustrating a street view image of a street and a graphical representation of the street including an object detection vector in accordance with one embodiment of the present invention.

For instance, FIG. 3 is a split view image illustrating the street view image 200 of the street 204 on which the vehicle 203 (and hence camera) is located and the corresponding graphical representation 202 of the street 204 on which the vehicle 203 (camera) is currently located. According to one example, upon analyzing the street view image 200 for utility poles, the vision system identifies a utility pole represented by vertical line 300. The utility pole 300 is associated with a horizontal position within the image space of the street view image 200. The horizontal position corresponds to a rotation angle about the origin of the camera 203. Based on the rotation angle and the position and orientation information of the camera 203, an object detection vector 302, identifying the location of the utility pole in relation to the camera 203 is generated. According to one embodiment, Mercator coordinates are utilized in the computation of the object detection vectors; however, any other known coordinate system may be used.

Figure 4A:
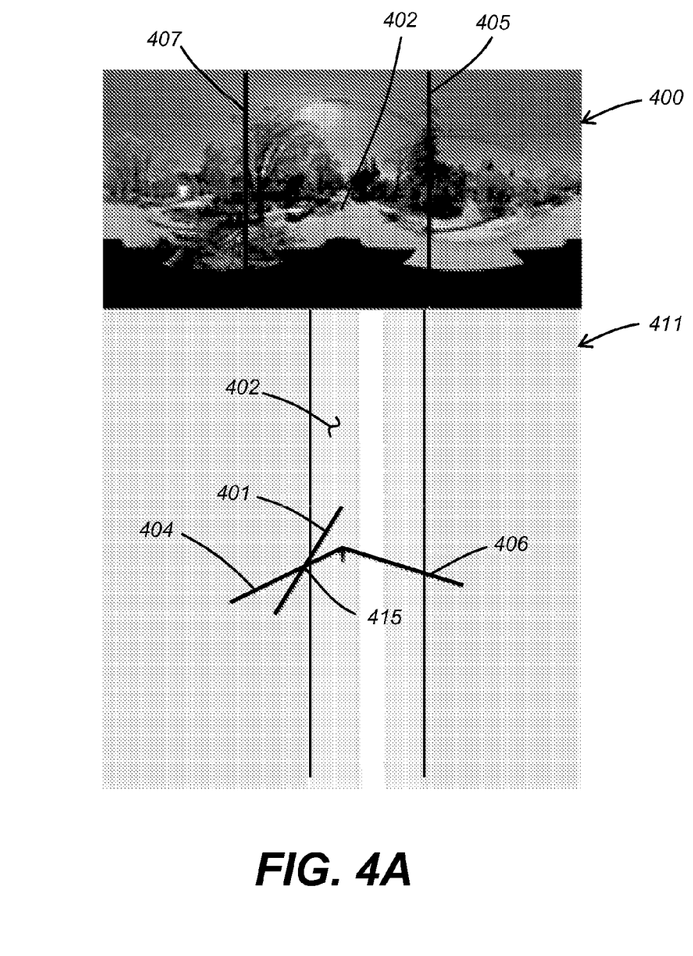
FIGS. 4A and 4B are split view images illustrating a street view image of a street and a graphical representation of the street including combinations of object detection vectors in accordance with one embodiment of the present invention.
Figure 4B:
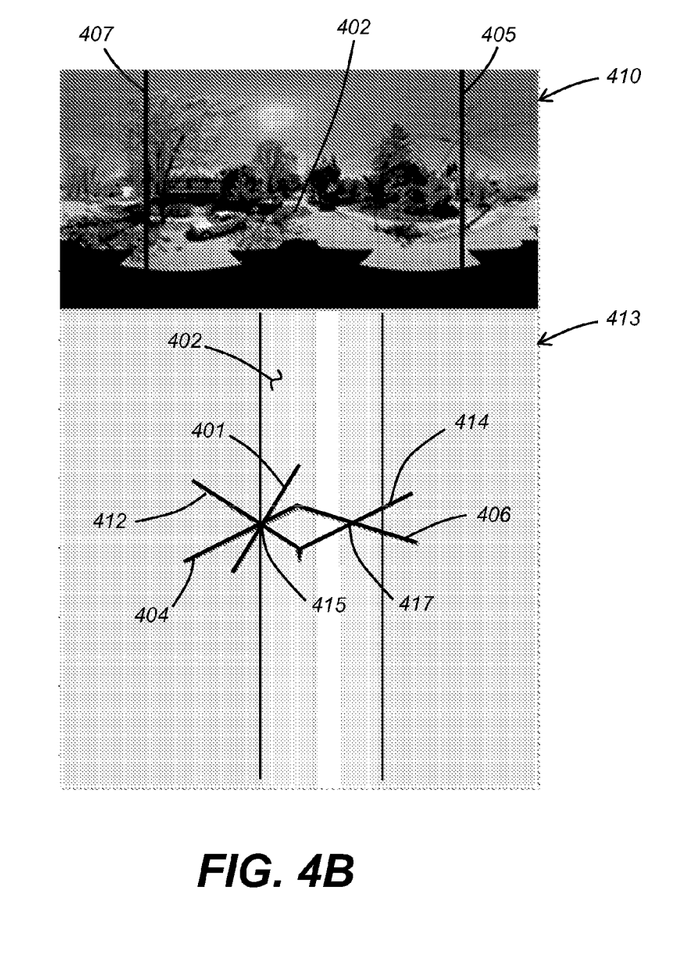

At block 110, the individually generated object detection vectors from each of the plurality of street view images are combined into a single representation. For example, FIGS. 4A and 4B are split view images illustrating street view images, 400 and 410 respectively, taken at different locations along a street 402 and corresponding graphical representations, 411 and 413 respectively. Each street view image 400, 410 is analyzed, as discussed above, for utility poles and appropriate object detection vectors are generated. In addition to object detection vectors generated in relation to the associated street view, each graphical representation 411, 413 also includes object detection vectors previously generated in relation to other street view images.

For example, as seen in FIG. 4A, object detection vectors 404, 406 are generated in response to the identification of utility poles 405, 407 in street view image 400, as discussed above. The object detection vectors 404, 406 are combined with an object detection vector 401, previously generated during the analysis of another street view image. As seen in FIG. 4B, object detection vectors 412, 414 are generated in response to the identification of utility poles 405, 407 in street view image 410, as discussed above. The object detection vectors 412, 414 are combined with the object detection vectors 404, 406 associated with street view image 400 and the object detection vector 401, previously generated during the analysis of another street view image. According to one embodiment, all of the object detection vectors generated from each of the plurality of retrieved street view images are combined into a single representation.

At block 112, any intersections of object detection vectors (treated as finite line segments) are analyzed to triangulate utility pole positions. For example, as seen in FIG. 4A, the intersection of the object detection vectors 404 and 401 indicates that the utility pole 405 is located at point 415. As seen in FIG. 4B, the intersection of the object detection vectors 412, 404 and 401 indicates that the utility pole 405 is located at point 415. The intersection of the object detection vectors 406, 414 indicates that the utility pole 407 is located at point 417.

After computing the different intersection points in relation to the generated object detection vectors, some intersection points may be redundant as a result of multiple pole detections occurring for the same pole. In addition, the intersection points may also contain "false" pole locations. Therefore, at block 114, an iterative clustering algorithm is performed to the identify "true" pole locations. One example of the clustering algorithm can be seen in FIG. 5.

Figure 5:
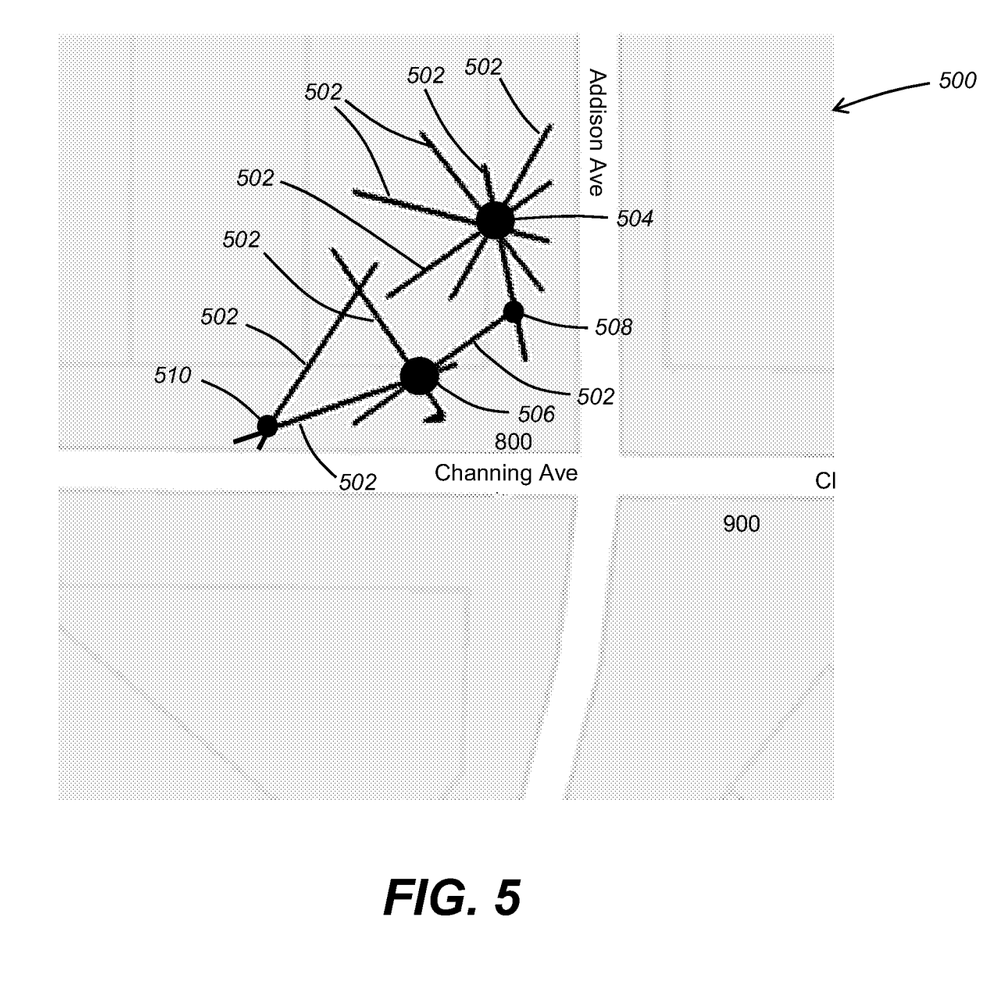
FIG. 5 is a graphical representation of a clustering algorithm in accordance with one embodiment of the present invention.

FIG. 5 is a graphical representation 500 of a plurality of object detection vectors 502 to generated as a result of analyzing a plurality of retrieved street view images, as discussed above. The plurality of object detection vectors 502 forms a variety of intersection points (i.e. indicating the potential presence of utility poles). The clustering algorithm groups the intersection points based on their proximity to each other and iteratively analyzes each cluster to identify which clusters should be dismissed as false and which clusters should be labeled as legitimate.

For example, with regards to FIG. 5, the clustering algorithm groups together all intersections within a proximity threshold. As shown in FIG. 5, this results in four clusters (e.g., cluster one 504, cluster two 506, cluster three 508 and cluster four 510). The algorithm then determines which cluster is the most legitimate by looking at the number of intersections contained in the cluster. For instance, as shown in FIG. 5, cluster one is identified as the most legitimate as it contains five detection vectors 502 passing through it.

Upon identifying cluster one 504 as the most legitimate, the five detection vectors 502 that contributed to intersections within cluster one 504 are disregarded as they are confirmed as associated with cluster one 504. Thus, cluster three 508, which relied on one of the disregarded vectors to form its cluster, is dismissed, as without the disregarded vector, the cluster no longer exists. The algorithm next iteratively analyzes the remaining two clusters (cluster two 506 and cluster four 510) to determine which one of the remaining clusters is the most legitimate. As cluster two 506 has the most intersections, it is labeled as legitimate, and its detection vectors are disregarded. Similarly as with cluster three 508, with the removal of the vectors associated with cluster two 506, cluster four 510 is dismissed as it no longer contains any intersections. As no clusters remain to analyze, the clustering algorithm has identified cluster one 504 and cluster two 506 as confirmed utility pole locations.

At block 116, additional filters may be applied to the confirmed utility pole locations to further improve the accuracy of the utility pole location data. In one embodiment, the confirmed utility pole locations are matched against satellite or aerial imagery to confirm the location of a utility pole. In another embodiment, a human operator reviews the confirmed utility pole locations (either by reviewing the street view images or the street itself) to ensure the accuracy of the utility pole location. In other embodiments, any other type of appropriate quality assurance measures may be utilized (e.g., such as crowd sourcing).

In another embodiment, in addition to the visual imagery (i.e. the street view images), additional data recorded by the vehicle may be utilized to further confirm the location of a utility pole. For example, laser point cloud data may be gathered by the vehicle as it traverses a street. In one embodiment, the laser point cloud data may include distance information such as how far an object is away from the street or the distance from the car to an object. This data may be useful in making the object detection vectors more accurate. This data may also be useful in confirming the presence of a desired object. For example, if an identified object is located too far from the street, it may be rejected as a potential utility pole. In this way, additional "false" utility pole locations may be further eliminated.

Figure 6:
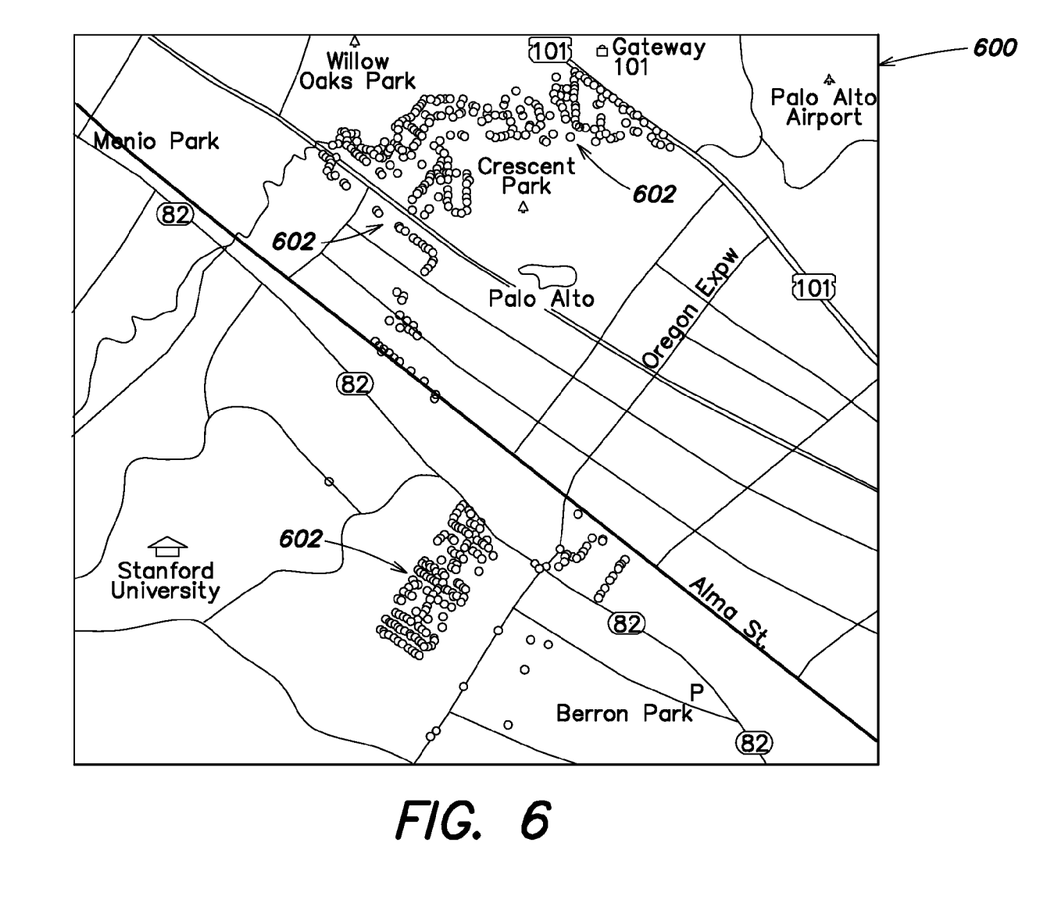
FIG. 6 illustrates an output map of utility pole locations in accordance with one embodiment of the present invention.

At block 118, either directly following the clustering algorithm or after any additional filtering, confirmed utility pole locations are output to the user. As illustrated in FIG. 6, a map 600 of the area originally defined by the user may be provided to the user. The map 600 includes identifying markers 602, each representing the location of an identified utility pole. Utilizing the accurate positions of the utility poles identified on the map 600, a user may be able to more efficiently and accurately design a utility network or construction project within the defined area.

According to one embodiment, a list of utility pole locations (e.g., a list of street address or GPS coordinates) may also be provided to the user. In another embodiment, in addition to the utility pole location data, a confidence number related to each utility pole location may also be provided to the user. The confidence number may indicate to the user, how likely it is that the utility pole location is accurate. If a utility pole location was confirmed via clustering, laser point cloud data, and aerial imagery, it will have a higher confidence number than a utility pole location that was only confirmed through clustering.

As described above, each one of the retrieved plurality of street view images is analyzed separately by a vision system to determine if at least one of the specified objects (e.g., a utility pole) is identified in the image. The operation of the vision system is now described in relation to FIGS. 7-9.

Figure 7:
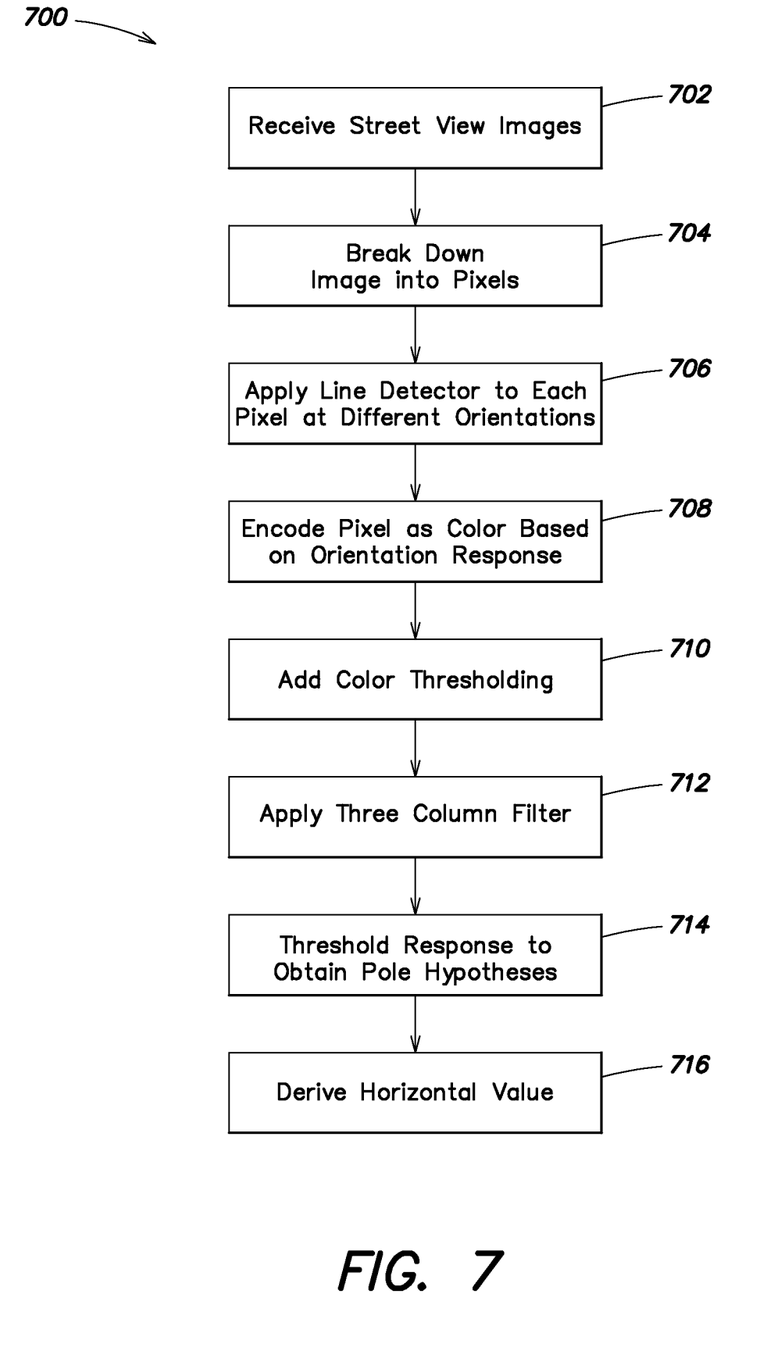
FIG. 7 is flow chart of a process for operating a vision system in accordance with one embodiment of the present invention.

FIG. 7 is a flow chart 700 of a process for operating a vision system to analyze a street view image in order to determine if at least one of a specified object (e.g., a utility pole) is identified in the image.

At block 702, the vision system receives the plurality of street view images retrieved from the database. The vision system treats each image as an individual vision problem and, at block 704, breaks down each image into individual pixels in order to identify specific features (e.g., vertical lines correlating to utility poles) within each image.

A common method for identifying features within an image includes using a single line detector (e.g., a vertical line detector). Such detectors respond strongly when an analyzed pixel matches the desired orientation. For example, a vertical line detector will respond strongest at a pixel that has a strong vertical structure above and below it. Vertical structure in this case may be defined by the length in pixels one can travel vertically from the given pixel such that the difference between one pixel and the next is within a specified error threshold. In effect, a vertical line detector is looking for vertical consistency.

However, in such a situation where the identification of a specific object, such as a utility pole, is desired, a single vertical line detector may not be useful. Because the vertical line detector analyzes each pixel for vertical consistency, it would respond the same way to a horizontal wall as it would a utility pole (i.e. both would have vertical consistency).

Therefore, embodiments herein, provide a detector capable of responding strongly to pixels having vertical structure, poorly to horizontal structure, and somewhere in between for diagonal structures.

At block 706, the vision system applies a line detector to each pixel at multiple orientations. For example, according to one embodiment, the vision system rotates each pixel sixteen times and records the response of the line detector to the pixel for each different orientation. In another embodiment, more or less than sixteen different orientations may be used. In another embodiment, rather than rotating the pixel, a plurality of line detectors, each orientated differently may be used.

In rotating the pixel and tracking the line detectors response to different orientations, the vision system is able to determine which pixels are likely to be part of a vertical structure, such as a utility pole. For example, the vision system identifies which pixels respond strongest to a vertical orientation while also responding poorest to a horizontal orientation.

At block 708, each pixel is encoded with a representation based on how the pixel responds to each orientation. For example, in one embodiment, each pixel is encoded as a color based on how the pixel responds to each orientation. Pixels that respond more strongly to vertical structure are encoded with a color closer to one end of the color spectrum and pixels that respond more strongly to horizontal structure are encoded with a color closer to the opposite end of the spectrum.

For example, according to one embodiment, pixels that respond strongest to vertical structure are encoded black, pixels that respond strongest to horizontal structure are encoded white and pixels that correspond to a structure somewhere in between (e.g., a diagonal to structure) are encoded as an appropriate shade of grey depending on whether the pixel is closer to being vertical (i.e. a darker shade of grey) or horizontal (i.e. a lighter shade of grey). As described herein, each pixel is encoded with a representative color; however, in other embodiments, any type of representation indicating how the pixel responded to the desired orientation (e.g., such as a number scale or ranking) may be used.

Figure 8:
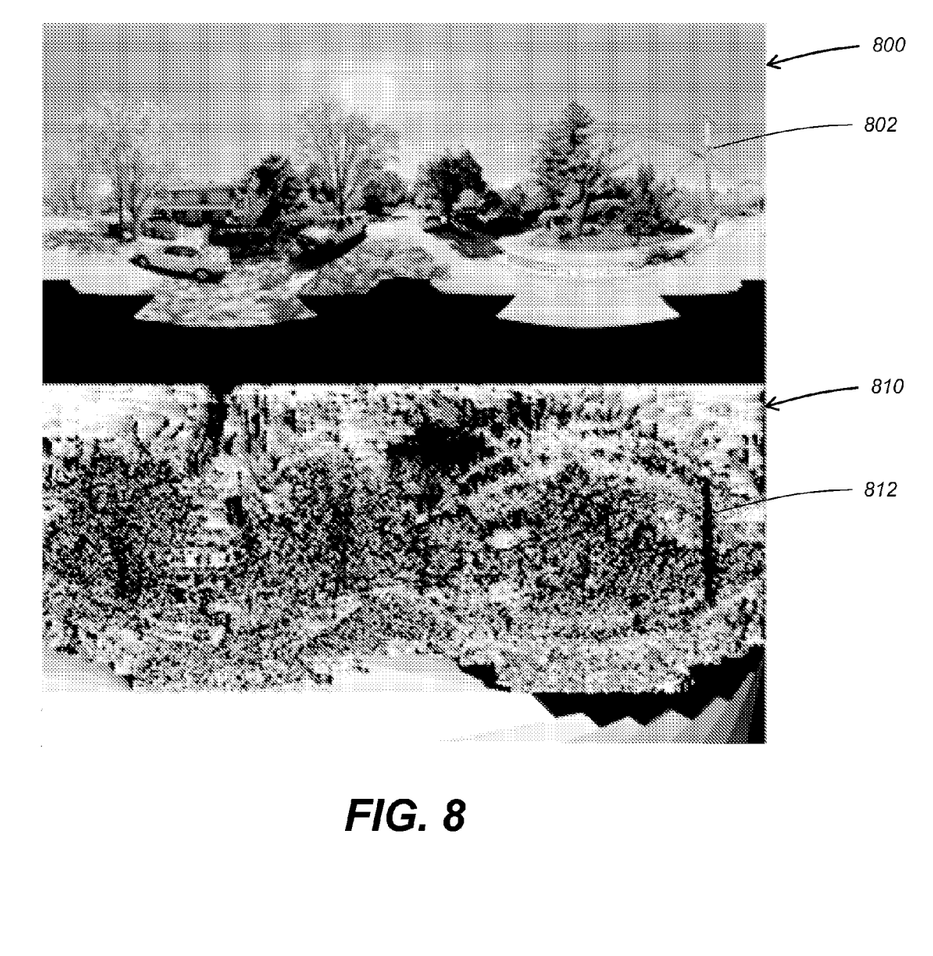
FIG. 8 is a split view image illustrating a street view image of a street and a color encoded image of the street in accordance with one embodiment of the present invention.

For example, FIG. 8 is a split view image illustrating a street view image 800 and a corresponding orientation based color encoded image 810. Upon breaking the street view image 800 down into pixels and applying the line detector to each pixel at different orientations, the pixels are color encoded based on their response to the different orientations, resulting in the orientation based color encoded image 810. As can be seen, the encoding of the utility pole 802 in the street view image 800, results in a line of encoded black pixels 812 having strong vertical structure and weak horizontal structure (i.e. a line indicating the presence of the utility pole 802).

Figure 9:
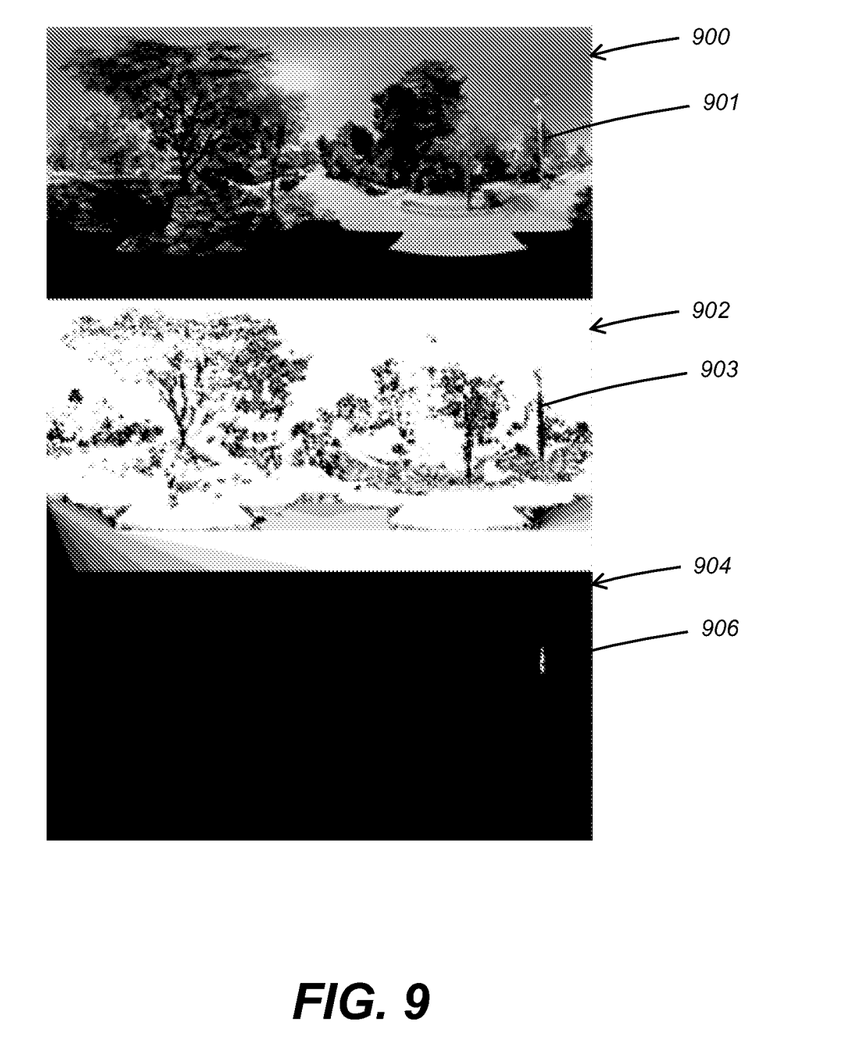
FIG. 9 is a split view image illustrating a street view image of a street, a color encoded image of the street and a filtered image of the street in accordance with one embodiment of the present invention.

At block 710, after generating a orientation based color encoded image, the color encoded image is further enhanced by adding color thresholding to remove pixels that were too green or blue (i.e. clearly not indicative of a utility pole). For example, FIG. 9 is a split view image illustrating a street view image 900 including a utility pole 901. After color encoding each pixel of the street view image 900 in relation to the line detector orientation response and also applying color thresholding, the intermediate image 902 is produced. The intermediate image 902 includes a line of encoded black pixels 903 having strong vertical structure and weak horizontal structure.

At block 712, a three column haar-like feature filter is applied to the intermediate image 902. The filter groups pixels into columns and analyzes three columns at a time. For example, the filter works by subtracting the summed intensity of the pixels in the middle column from the summed intensity of the pixels in the side columns. Thus, an area of strong dark vertical pixels with strong light vertical pixels on either side will respond best.

At block 714, a threshold is applied to the response from the three column filter to obtain pole hypotheses, indicated by the white pixels 906 in the bottom image 904. The line of white pixels 906 indicates a line of pixels with strong vertical structure and weak horizontal structure (i.e. an object such as a utility pole). In other embodiments, any other appropriate methods of thresholding and filtering may be utilized to accurately identify pixels indicating the presence of a desired object (e.g., a utility pole).

At block 716, a single horizontal value is derived from the group of white pixels 906. to According to one embodiment, the group of white pixels 906 is clustered into a single value by finding the average horizontal location of the group of white pixels 906. The resulting horizontal value is used, as discussed above, to generate a rotational angle (and vector) corresponding to the identified utility pole.

Various embodiments according to the present invention may be implemented on one or more computer systems or other devices capable of automatically identifying a channel and/or program as described herein. A computer system may be a single computer that may include a minicomputer, a mainframe, a server, a personal computer, or combination thereof. The computer system may include any type of system capable of performing remote computing operations (e.g., cell phone, PDA, set-top box, or other system). A computer system used to run the operation may also include any combination of computer system types that cooperate to accomplish system-level tasks. Multiple computer systems may also be used to run the operation. The computer system also may include input or output devices, displays, or storage units. It should be appreciated that any computer system or systems may be used, and the invention is not limited to any number, type, or configuration of computer systems.

These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate play of the described system according to various embodiments of the invention. Further, the system may be located on a single computer or may be distributed among a plurality of computers attached by a communications network.

Figure 10:
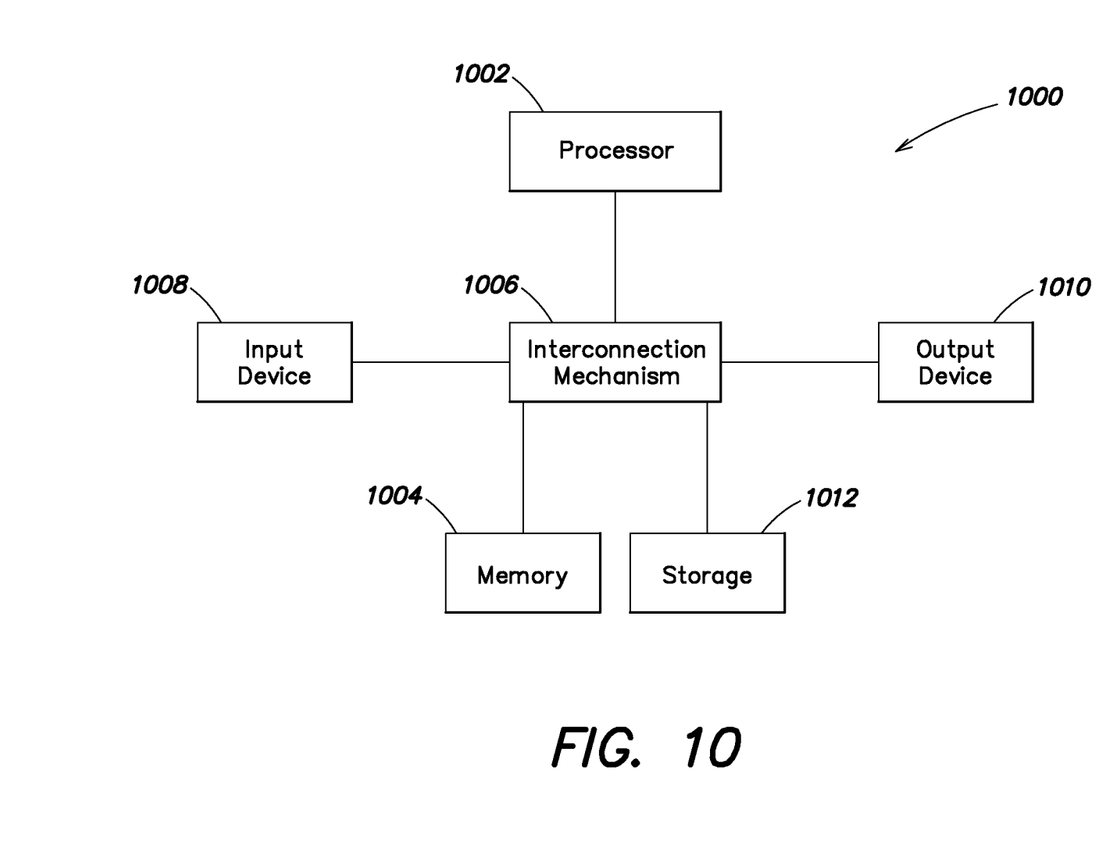
FIG. 10 is a block diagram of a general-purpose computer system upon which various embodiments of the invention may be implemented.

For example, various aspects of the invention may be implemented as specialized software executing in a general-purpose computer system 1000 such as that shown in FIG. 10. The computer system 1000 may include a processor 1002 connected to one or more memory devices 1004, such as a disk drive, memory, or other device for storing data. Memory 1004 is typically used for storing programs and data during operation of the computer system 1000. Components of computer system 1000 may be coupled by an interconnection mechanism 1006, which may include one or more busses (e.g., between components that are integrated within a same machine) and/or a network (e.g., between components that reside on separate discrete machines). The interconnection mechanism 1006 enables communications (e.g., data, instructions) to be exchanged between system components of system 1000. Computer system 1000 also includes one or more input devices 1008, for example, a keyboard, mouse, trackball, to microphone, touch screen, and one or more output devices 1010, for example, a printing device, display screen, and/or speaker. In addition, computer system 1000 may contain one or more interfaces (not shown) that connect computer system 1000 to a communication network (in addition or as an alternative to the interconnection mechanism 1006.

Figure 11:
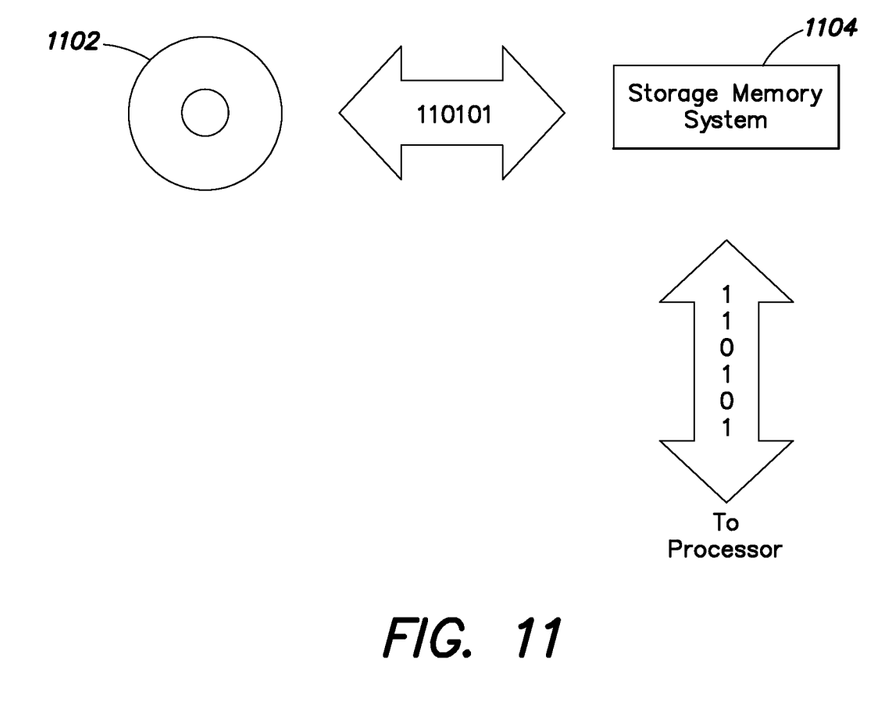
FIG. 11 is a block diagram of a computer data storage system with which various embodiments of the invention may be practiced.

The storage system 1012, shown in greater detail in FIG. 11, typically includes a computer readable and writeable nonvolatile recording medium 1102 in which signals are stored that define a program to be executed by the processor or information stored on or in the medium 1102 to be processed by the program. The medium may, for example, be a disk or flash memory. Typically, in operation, the processor causes data to be read from the nonvolatile recording medium 1102 into another memory 1104 that allows for faster access to the information by the processor than does the medium 1102. This memory 1104 is typically a volatile, random access memory such as a dynamic random access memory (DRAM) or static memory (SRAM). It may be located in storage system 1012, as shown, or in memory system 1004. The processor 1002 generally manipulates the data within the integrated circuit memory 1004, 1104 and then copies the data to the medium 1102 after processing is completed. A variety of mechanisms are known for managing data movement between the medium 1102 and the integrated circuit memory element 1004, 1104, and the invention is not limited thereto. The invention is not limited to a particular memory system 1004 or storage system 1012.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 1000 is shown by way of example as one type of computer system upon which various aspects of the invention may be practiced, it should be appreciated that aspects of the invention are not limited to being implemented on the computer system as shown in FIG. 10. Various aspects of the invention may be practiced on one or more computers having a different architecture or components that that shown in FIG. 10.

Computer system 1000 may be a general-purpose computer system that is programmable using a high-level computer programming language. Computer system 1000 may be also implemented using specially programmed, special purpose hardware. In computer system 1000, processor 1002 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME), Windows XP, or Windows Visa operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol. Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention to may be implemented as programmed or non-programmed elements, or any combination thereof.

As described herein, the vision system is configured to identify utility poles within the received images; however, in other embodiments, the vision system may be configured to identify any number of different objects. For example, the vision system may be configured to identify objects with strong horizontal structure and weak vertical structure. In another example, the vision system may be configured to identify objects with a specific width (e.g., a horizontal structure with a certain width may be identified as a park bench). In one more example, rather than identifying objects with strong vertical structure and weak horizontal structure, the line detector system may be replaced with a trained image/feature detector. In this way, the vision system may be trained to recognize any type of object or feature with a specific shape (e.g., a fire hydrant, a stop sign etc.) as long as the system is trained in advance to recognize the shape.

As described herein, the plurality of street view images is retrieved from a database; however, in other embodiments, the individual images may be manually uploaded by the user wishing to analyze the images. Also, as described herein, the images retrieved from a database include images of streets and their surrounding areas; however, in other embodiments, the images may be of any other type of location (e.g., within a building, along the coast, aerial images taken from an airplane etc.).

As described above, embodiments herein provide a more efficient and accurate system and method for determining the geographic location of an object by analyzing a plurality of street view images, using a vision system to identify the presence of objects within any of the plurality of images, generating object location related vectors based on each identified object, and based on the combination of vectors from each of the plurality of images, triangulating the location of specific objects. In this way a user may be able to efficiently and accurately determine the location of specific objects prior to beginning utility or construction work.

Having thus described several aspects of at least one embodiment of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

What is claimed is:

1. A method for determining the geographic location of an object, the method comprising:
retrieving, by one or more processors, a plurality of images from a database, each image related to a respective vantage point;
analyzing, by the one or more processors, each image to determine if the object is present in the image;
detecting, by the one or more processors, the object in at least two of the plurality of images;
generating, by the one or more processors, a vector in relation to the respective vantage point for each image in which the object was detected; and
triangulating, based on the intersection of at least two vectors, the geographic location of the object.

2. The method of claim 1, further comprising combining, in a single representation, vectors from each image in which the object was detected.

3. The method of claim 1, further comprising outputting to an interface a representation of the geographic location of the object.

4. The method of claim 1, further comprising filtering the geographic location of the object.

5. The method of claim 4, wherein filtering the geographic location of the object comprises:
clustering intersections of vectors into groups based on proximity;
identifying a first group of vectors containing the highest number of intersections;
disregarding vectors included within the first group;
identifying, in response to disregarding, a second group of vectors which no longer contains intersections; and
eliminating, in response to identifying, vectors included within the second group.

6. The method of claim 4, wherein filtering the geographic location of the object comprises confirming the presence of the object in reference to aerial or satellite imagery.

7. The method of claim 4, wherein filtering the geographic location of the object comprises confirming the presence of the object in reference to point cloud data of the geographic location.

8. The method of claim 1, wherein generating a vector comprises:
calculating a horizontal position for each image in which the object was detected;
associating each horizontal position with a rotational angle in relation to the respective vantage point of the related image.

9. The method of claim 1, wherein the one or more processors are configured to:
break down each image into a plurality of pixels; and
individually analyze each pixel for a structure representative of the object.

10. The method of claim 9, wherein individually analyzing comprises:
applying a single line detector to each one of the plurality of pixels at a plurality of different orientations; and recording each pixel's response to the line detector at each one of the plurality of different orientations.

11. The method of claim 10, further comprising encoding each pixel with a color indicative of whether the pixels response to the line detector signifies the presence of the structure representative of the object.

12. The method of claim 11, wherein calculating the horizontal position comprises:
filtering the encoded pixels to identify a grouping of pixels indicative of the presence of the structure representative of the object; and
calculating an average horizontal position of the grouping of pixels.

13. A system for determining the geographic location of an object, the system comprising:
an interface configured to receive a defined geographic area from a user;
a database configured to store a plurality of images in relation to the defined geographic area;
a vision system configured to receive the plurality of images from the database, analyze each image to determine if the object is present in the image, and identify the presence of the object within at least two of the plurality of images; and
a processor configured to generate a vector for each image in which the object was detected and triangulate, based on the intersection of at least two vectors, the geographic location of the object.

14. The system of claim 13, further comprising an output display configured to provide the geographic location of the object to the user.

15. The system of claim 13, wherein the vision system comprises:
a single line detector; and
an encoder,
wherein the vision system is configured to break down each one of the plurality of images into a plurality of pixels and apply the single line detector to each one of the plurality of pixels at a plurality of different orientations, and
wherein the encoder is configured to encode each pixel with a color indicative of whether the pixels response to the line detector signifies the presence of a structure representative of the object.

16. The system of claim 13, wherein in generating the vector for each image, the processor is further configured to calculate a horizontal position for each image in which the object was detected, associate each horizontal position with a rotational angle in reference to the related image.

17. A non-transitory computer readable medium comprising computer-executable instructions that when executed on a processor performs a method for determining the geographic location of an object, the method comprising acts of:
retrieving at a vision system a plurality of images from a database, each image related to a respective vantage point;
analyzing, with the vision system, each image to determine if the object is present in the image;
detecting, with the vision system, the object in at least two of the plurality of images;
generating a vector in relation to the respective vantage point for each image in which the object was detected; and
triangulating, based on the intersection of at least two vectors, the geographic location of the object.

18. The computer readable medium according to claim 17, wherein generating a vector comprises:
calculating a horizontal position for each image in which the object was detected;
associating each horizontal position with a rotational angle in relation to the respective vantage point of the related image.

19. The computer readable medium according to claim 17, wherein the vision system is configured to:
break down each image into a plurality of pixels;
apply a single line detector to each one of the plurality of pixels at a plurality of different orientations; and
record each pixel's response to the line detector at each one of the plurality of different orientations.

20. The computer readable medium according to claim 19, wherein the method further comprises encoding each pixel with a representation indicative of whether the pixels response to the line detector signifies the presence of a structure representative of the object.

* * * * *